United States Patent
Wendt et al.

(10) Patent No.: US 9,803,670 B2
(45) Date of Patent: Oct. 31, 2017

(54) CONNECTION ARRANGEMENT

(71) Applicant: Phoenix Contact GmbH & Co. KG, Blomberg (DE)

(72) Inventors: Andreas Wendt, Berlin (DE); Ralf Beckmann, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/320,356

(22) PCT Filed: Apr. 28, 2015

(86) PCT No.: PCT/EP2015/059153
§ 371 (c)(1),
(2) Date: Dec. 20, 2016

(87) PCT Pub. No.: WO2015/197235
PCT Pub. Date: Dec. 30, 2015

(65) Prior Publication Data
US 2017/0159686 A1 Jun. 8, 2017

(30) Foreign Application Priority Data
Jun. 25, 2014 (DE) ........................ 10 2014 108 907

(51) Int. Cl.
*F16B 5/06* (2006.01)
*F16B 2/22* (2006.01)
(52) U.S. Cl.
CPC .............. *F16B 5/0685* (2013.01); *F16B 2/22* (2013.01)

(58) Field of Classification Search
CPC .... H01R 13/745; H01R 13/74; H01R 13/743; H01R 13/741
(Continued)

(56) References Cited

U.S. PATENT DOCUMENTS 2,869,094 A * 1/1959 Francis ................ H01R 13/745
439/550
3,793,613 A * 2/1974 Reichert .............. H01R 13/745
439/565

(Continued)

FOREIGN PATENT DOCUMENTS

DE 112012003463 T5 5/2014
DE 102014103991 A1 9/2015
(Continued)

*Primary Examiner* — Gary Paumen
(74) *Attorney, Agent, or Firm* — Leydig, Voit & Mayer, Ltd.

(57) ABSTRACT

A connection arrangement includes a housing body having a connection portion, at which in each case at least one housing bearing wedge having a bearing face which is oriented at a wedge angle to an assembly direction is formed on two opposing sides; a bearing portion; and a clamping face which is formed on the bearing portion being provided at a distance from the bearing face of the at least one housing bearing wedge. The connection arrangement further includes a connection body which can be positioned on the housing body in the region of the connection portion, on which connection body at least one connection bearing wedge is provided, which has a bearing face which is oriented at the same wedge angle to the assembly direction, the bearing faces of the housing bearing wedge and of the connection bearing wedge being in contact with one another when assembled.

9 Claims, 9 Drawing Sheets

(58) Field of Classification Search
USPC .................................................. 439/550, 545
See application file for complete search history.

(56) References Cited

U.S. PATENT DOCUMENTS

| | | | | |
|---|---|---|---|---|
| 5,066,247 | A * | 11/1991 | Watson ................ | H01R 13/745 248/27.1 |
| 5,127,852 | A * | 7/1992 | Cravens ............... | H01R 13/745 439/545 |
| 6,030,242 | A * | 2/2000 | Cunningham ..... | H01R 13/6315 439/247 |
| 6,176,738 | B1 * | 1/2001 | Consoli ............... | H01R 13/631 439/545 |
| 6,966,794 | B2 * | 11/2005 | Aoyama ................ | H01R 13/73 439/545 |
| 2008/0200064 | A1 * | 8/2008 | Chong .................... | H02G 3/22 439/571 |
| 2014/0169871 | A1 * | 6/2014 | Nishiyama ......... | H01R 13/4362 403/374.1 |

FOREIGN PATENT DOCUMENTS

EP           1942567 A2    7/2008
JP         2000346040 A   12/2000

\* cited by examiner

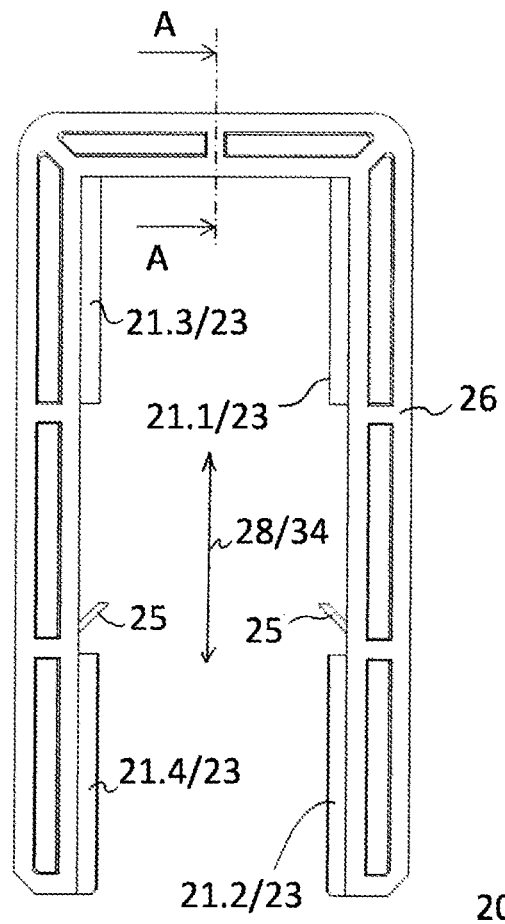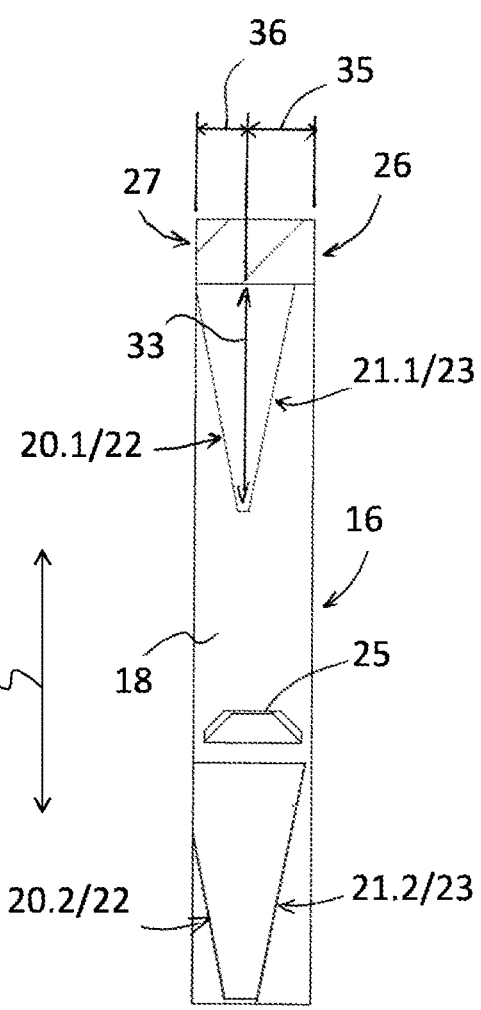
Fig 7
Fig 8

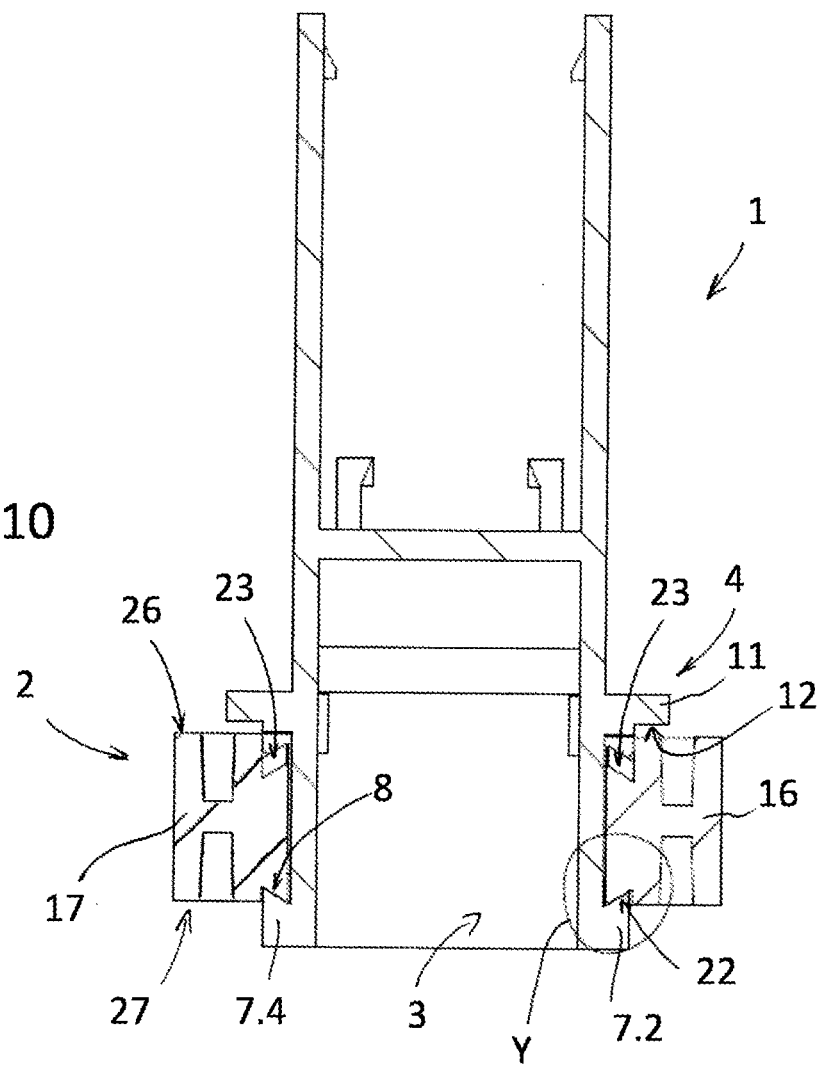
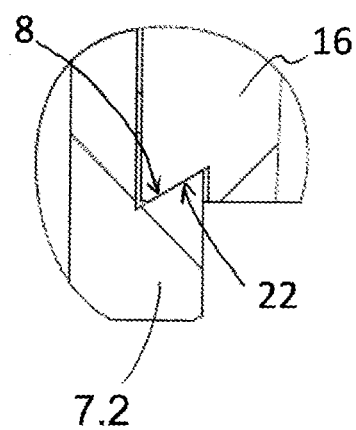
Fig 10
Fig 11

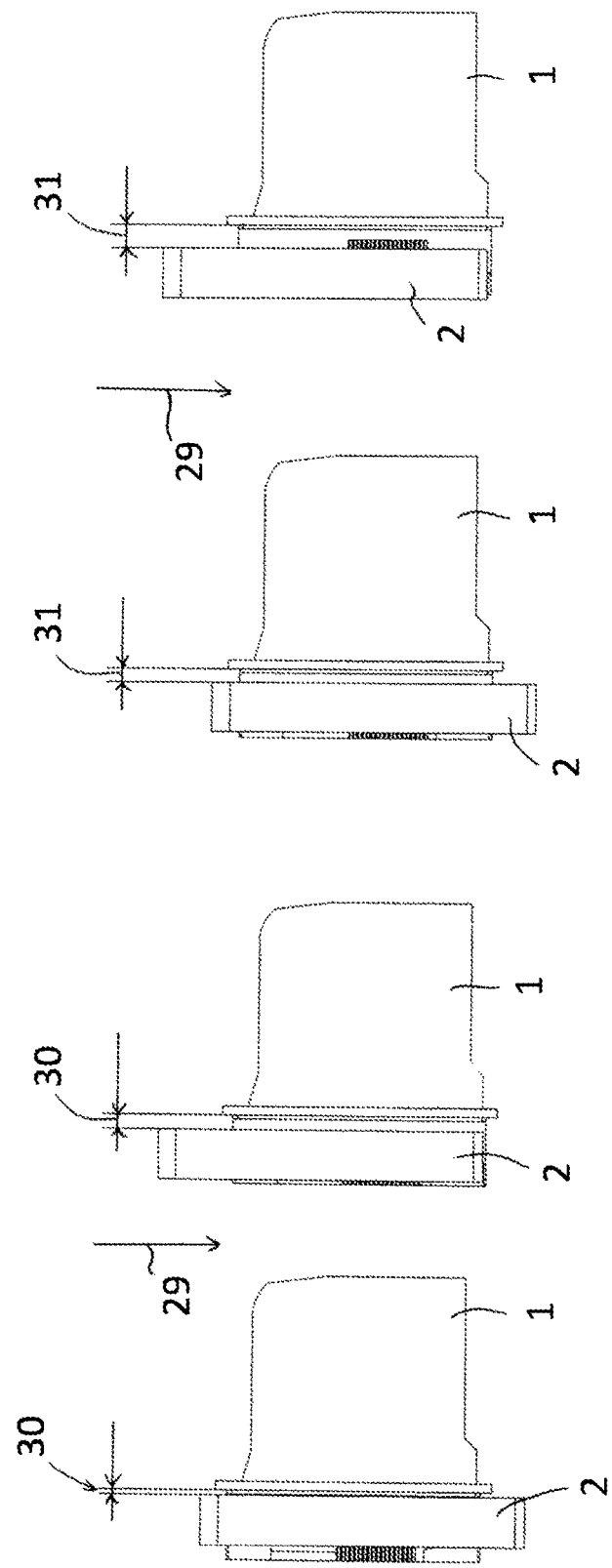

CONNECTION ARRANGEMENT

CROSS-REFERENCE TO PRIOR APPLICATIONS

This application is a U.S. National Phase application under 35 U.S.C. §371 of International Application No. PCT/EP2015/059153, filed on Apr. 28, 2015, and claims benefit to German Patent Application No. DE 10 2014 108 907.3, filed on Jun. 25, 2014. The International Application was published in German on Dec. 30, 2015 as WO 2015/197235 A1 under PCT Article 21(2).

FIELD

The invention relates to a connection arrangement comprising a housing body having a connection portion, at which in each case at least one housing bearing wedge having a bearing face which is oriented at a wedge angle to an assembly direction is formed on two opposing sides, and comprising a bearing portion, a clamping face which is formed on the bearing portion being provided at a distance from the bearing face of the at least one housing bearing wedge, and comprising a connection body which can be positioned on the housing body in the region of the connection portion.

BACKGROUND

A generic connection arrangement is used for example to fasten a terminal to a device wall. The connection arrangement comprises in this case a housing body, a bearing portion of which is positioned on a recess in the housing wall, and a connection body which is positioned on a connection portion of the housing body. In each case, correspondingly designed bearing wedges comprising bearing faces which are in contact with one another when assembled are provided on the housing body and on the connection body. The bearing wedges are jammed in order to lock the housing body and the connection body on the device wall.

For example, in order to lock the terminals, the geometry of the housing body and the connection body are adapted to a wall thickness of the device. Each housing body and connection body is then suitable for a specific device wall thickness. In this respect, a large number of connection arrangements are required in order to provide connection arrangements which are suitable for any desired device wall thicknesses. For example, the bearing wedge the connection body can have a comparatively long design in order to achieve a high degree flexibility and to ensure locking when there are as many different device wall thicknesses as possible. However, depending on the actual geometrical proportions, the connection body can protrude out comparatively far or have undesirably large dimensions. For example, it is to provide the housing bearing wedge at a large distance from the device wall and to spacing elements according to each assembly situation in order to ensure locking of the wedges on one another regardless of the device wall thickness. However, the installation increase considerably as a result.

A generic connection arrangement is disclosed for example in the post published German patent application DE 10 2014 103 991.2, which was filed by the applicant. In this case, it is provided that a plurality of housing bearing wedges are provided at a distance from one another on the connection portion of the housing body. In this case, a receiving groove for a correspondingly shaped connection bearing wedge of the connection body is formed between adjacent housing bearing wedges. Depending on each assembly situation, in this respect, it is possible to lock the connection bearing wedge on a selected housing bearing wedge which is at the optimum distance from the device wall. This thus results in a high degree of flexibility. In particular, it is possible to lock terminals on device walls of different thicknesses using only one connection arrangement.

SUMMARY

In an embodiment, the present invention provides a connection arrangement comprising: a housing body having a connection portion, at which in each case at least one housing bearing wedge having a bearing face which is oriented at a wedge angle to an direction is formed on two opposing sides; a bearing portion; and a clamping face which is formed on the bearing portion being provided at a distance from the bearing face of the at one housing bearing wedge; and a connection body which can be positioned on the housing body in the region of the connection portion, on which connection body at least one bearing wedge is provided, which has a bearing face which is oriented at the same wedge to the assembly direction, the bearing faces of the housing bearing wedge and of the bearing wedge being in contact with one another when assembled. On the connection body, least a first connection bearing wedge and a second connection bearing wedge are provided, a first bearing face being provided on the first connection bearing wedge, and a second bearing face being provided on the second connection bearing wedge, the first bearing face and the second bearing face enclosing the same size wedge angle. The wedge angle which is formed between the first bearing face and the assembly direction is provided as a mirror image with respect to the second wedge angle which is formed between the second bearing face and the assembly direction, such that, in a first assembly position, the first bearing face of the connection body is arranged on the bearing face of the housing bearing wedge, and such that, a second assembly position which is occupied by rotating the connection body by 180° about an assembly axis of rotation, the second bearing face of the connection body is arranged on bearing face of the housing bearing wedge.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 7 is a front side view of the connection body according to FIG. 6, FIG. 8 is a sectional view of the connection body in accordance with the section A-A according to FIG. 7, FIG. 10 is a sectional view through the connection arrangement in accordance with the section B-B according to FIG. 9, FIG. 11 is an enlargement of a detail of a portion Y according to FIG. 10, FIG. 14 shows a first assembly situation for the connection arrangement according to the invention, FIG. 15 shows a second assembly situation for the connection arrangement according to the invention, FIG. 16 shows a third assembly situation for the connection arrangement according to the invention, and FIG. 17 shows a fourth assembly situation for the connection arrangement according to the invention.

DETAILED DESCRIPTION

Figure 1:
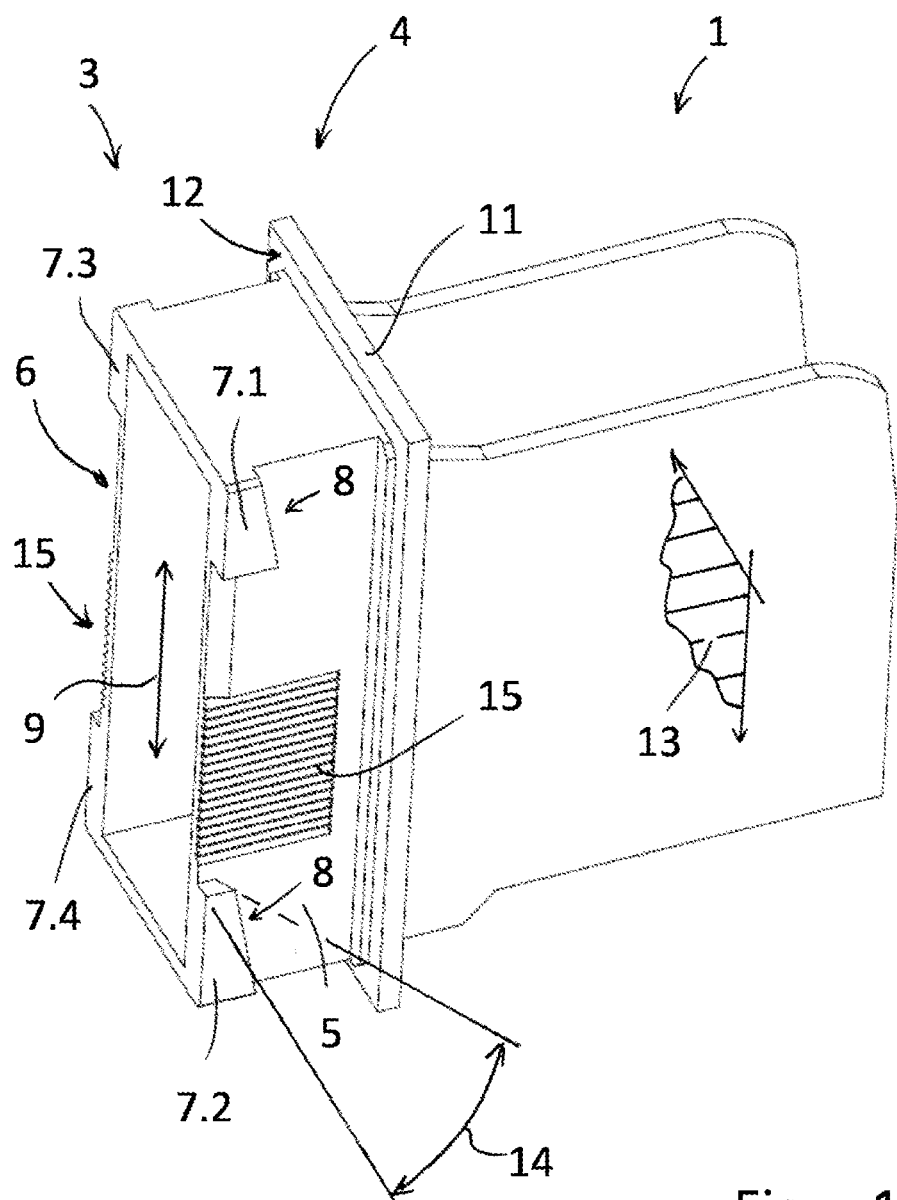
FIG. 1 is a perspective view of a housing body of a connection arrangement according to the invention.
Figure 2:
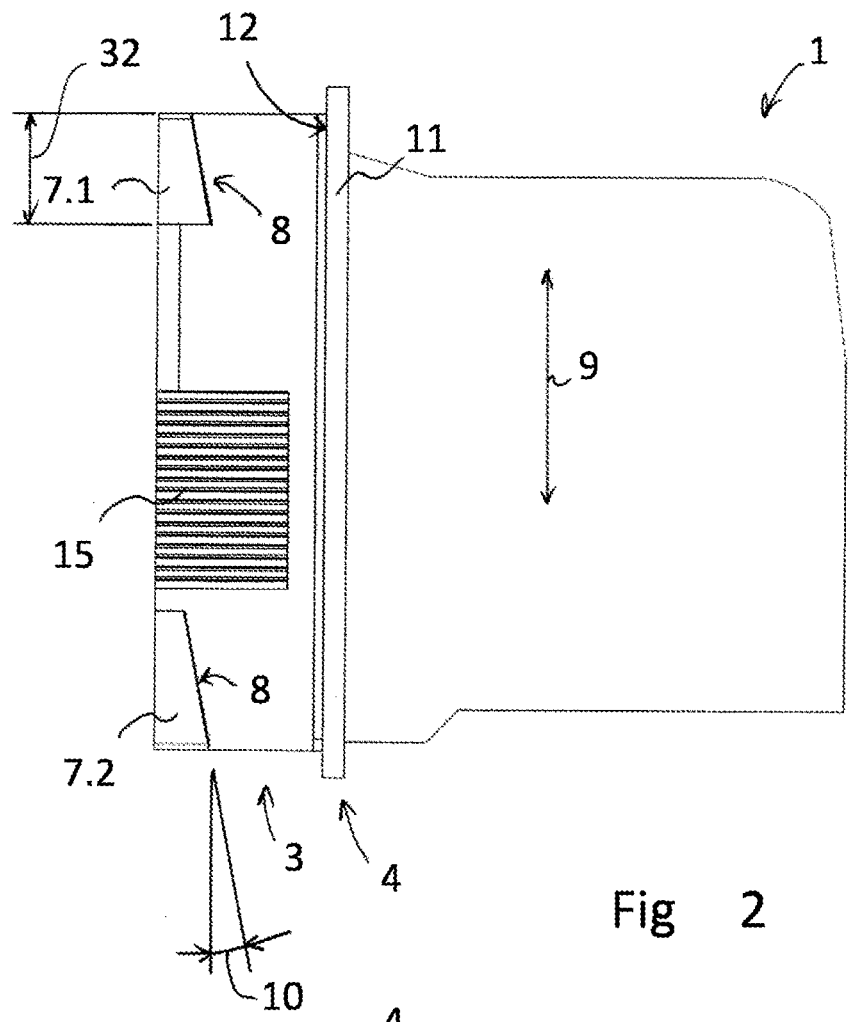
FIG. 2 is a side view of the housing body according to FIG. 1.
Figure 3:
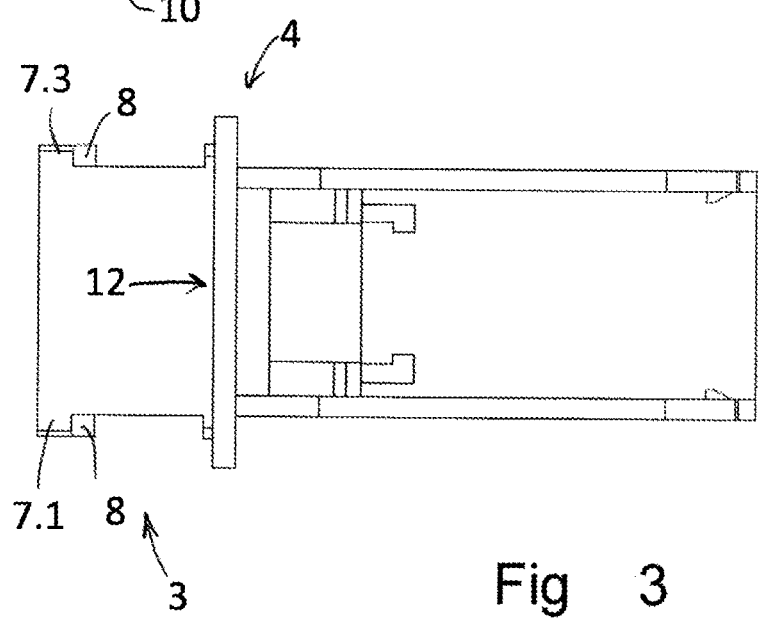
FIG. 3 is a plan view of the housing body according to FIG. 1.
Figure 4:
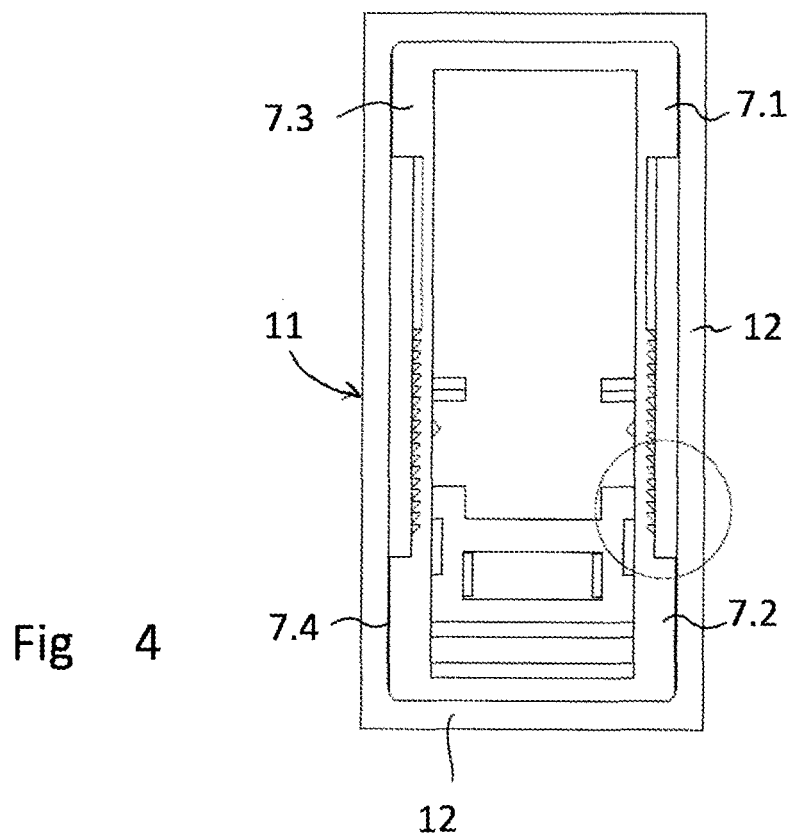
FIG. 4 is a front side view of the housing body according to FIG. 1.
Figure 5:
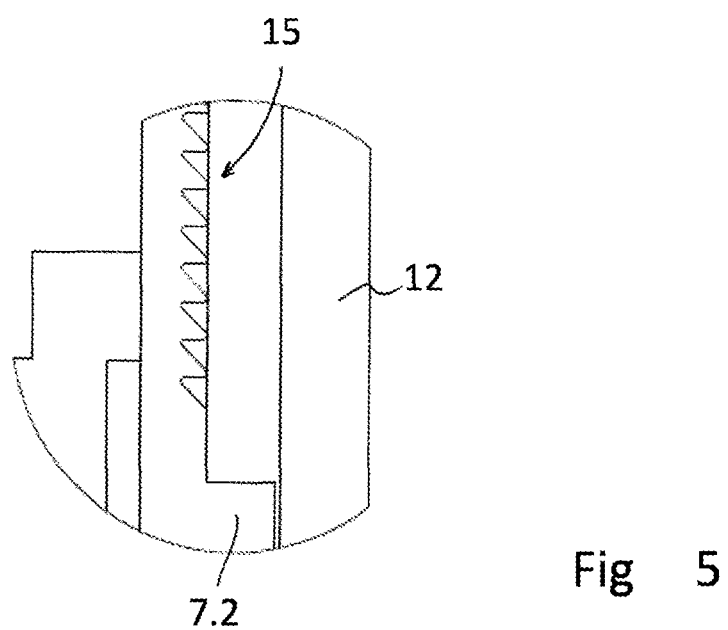
FIG. 5 is an enlargement of a detail of a portion X according to FIG. 4.

In an embodiment of the invention at least a first connection bearing wedge and a second connection bearing wedge are provided on the connection body, a first bearing face being provided on the first connection bearing wedge, and a second bearing face being provided on the second connection bearing wedge, the first bearing face and the second bearing face enclosing the same size wedge angle with the assembly direction, and the wedge angle which is formed between the first bearing face and the assembly direction being provided as a mirror image with respect to the second wedge angle which is formed between the second bearing face and the assembly direction, in such a way that, in a first assembly position, the first bearing face of the connection body is arranged on the bearing face of the housing bearing wedge, and in that, in a second assembly position which is occupied by rotating the connection body by 180° about an assembly axis of rotation, the second bearing face of the connection body is arranged on the bearing face of the housing bearing wedge.

A particular advantage of the invention consists in the fact that a tool for producing the components of the connection arrangement in particular of the housing body and of the connection body, can be provided in a cost-effective manner. Owing to the low tool costs, the costs for the connection arrangement and the components thereof are likewise lowered. In particular, for the production of a bearing wedge, only a simple opening and closing tool is required. To produce the housing body, fewer sliders are used. Nevertheless, the flexibility with respect to the different device wall thicknesses is maintained. The connection arrangement according to the invention can optionally be locked in a first assembly position or, after the rotation of the connection body by 180°, in a second assembly position on the recess in the device wall. Depending on the structural design, it is then possible to use the same connection arrangement for different device wall thicknesses depending on the rotational position. The connection arrangement is extremely simple to handle and assemble. In each case, the connection body is positioned on the connection portion of the housing body in the assembly position. The corresponding procedure corresponds to the assembly sequence which has long been known. Only by rotating the connection body by 180° about an assembly axis of rotation can said body be changed between the first assembly position and the second assembly position.

Corresponding to the 180° rotation about the assembly axis of rotation, the same size wedge angles of the connection bearing wedges are provided with opposite signs or are provided as a mirror image with respect to the assembly direction. Due to the same size wedge angles of the connection body, the first bearing face or the second bearing face of the connection body can optionally be positioned in the correspondingly shaped bearing face of the housing body. In particular, the wedge angle can be selected in such a way that self-locking is achieved, and the connection is prevented from being unintentionally disconnected.

According to a preferred embodiment of the invention, a first clamping face which is functionally assigned to the first bearing face, and a second clamping face which is functionally assigned to the second bearing face are provided on the connection body. A distance between a reference point of the first bearing face and the first clamping face is in particular greater than a distance between a correspondingly selected reference point of the second bearing face relative to the second clamping face. Advantageously, by means of the distance dimension, it is possible to establish for which device wall thicknesses the arrangement can be used. In this respect, the different distance dimensions are characteristic the permissible device wall thicknesses. A length of the bearing wedges, which is determined in the assembly direction, additionally defines a wall thickness interval which can be compensated in the first assembly position or in the second assembly position by the relative position of the connection body to the housing body.

According to one development of the invention, the geometrical proportions on the connection body can be selected in particular so that in the first assembly position, a distance between the first clamping face of the connection body and the clamping face which is formed on the bearing portion of the housing body is between 0.5 mm and 3.5 mm, preferably between 1 mm and 3 mm. In the second assembly position, a distance between the second clamping face of the connection body and the clamping face which is formed on the bearing portion of the housing body can be between 2.5 mm and 5.5 mm, preferably between 3 mm and 5 mm. In this respect, it is possible, depending on the selection of the assembly position, to lock the same connection arrangement on a device having a device wall thickness of from 0.5 mm to 5.5 mm. This thus results in a high degree of flexibility with respect to device wall thickness.

According to the invention, it can be provided in particular that the wall thicknesses which are shown in the first assembly position and the wall thicknesses which are shown in the second assembly position complement one another and in particular are designed to be immediately adjacent to one another or to overlap one another. The adjustment interval for each individual assembly position can in this case be determined in particular by means of the wedge angle and the length of the involved bearing wedges which is defined in the assembly direction.

According to one development of the invention, the bearing faces which are provided on the connection body as well as the bearing faces which are provided on the housing body can be oriented at a corresponding setting angle with respect to a plane of extension of the assigned clamping faces of the connection body and of the housing body. additional formation of a setting angle on the bearing faces allows further improvement of the locking of the connection body on the housing body. In particular, by suitably selecting the setting angle, it can be achieved that, when assembled, the connection body is jammed the housing body or moved closer thereto in the course of the assembly. Providing the setting angle in this respect promotes a sturdy locking of the connection arrangement on the device wall.

According to one development of the invention, the assembly axis of rotation for the connection body is oriented in the assembly direction when assembled. Advantageously, the assembly is simplified by the corresponding arrangement. The connection arrangement is operated intuitively, and incorrect operation or incorrect assembly is counteracted.

According to one development of the invention, in each case at least two housing bearing wedges or connection bearing wedges are provided on the connection body on two opposing sides. In this case, the bearing wedges which are provided on the same side are at a distance from one another. Advantageously, by providing the plurality of bearing wedges, the locking can be improved. The plurality of the bearing wedges can be arranged for example symmetrically. There is thus a symmetrical transmission of forces or support, which is advantageous in terms of stability.

According to one development of the invention, a snap connection is provided, by means of which the connection body is connected to the housing body in the first assembly position or in the second assembly position. As part of the snap connection, in particular a resiliently provided snap-in element and a snap-in receiver are provided for the snap-in element. In order to lock the connection body on the housing body, the snap-in element engages in the snap-in receiver. Advantageously, as a result of providing the snap connection, the connection body is locked on the housing body in an interlocking manner. Unintentional disconnection of the connection arrangement is counteracted as a result.

Further advantages, features and details of the invention can be found in the additional dependent claims and the following description. Features mentioned therein can each be essential to the invention individually per se or also in any desired combination. The drawings are merely used by way of example to clarify the invention and have no restrictive effect.

Figure 6:
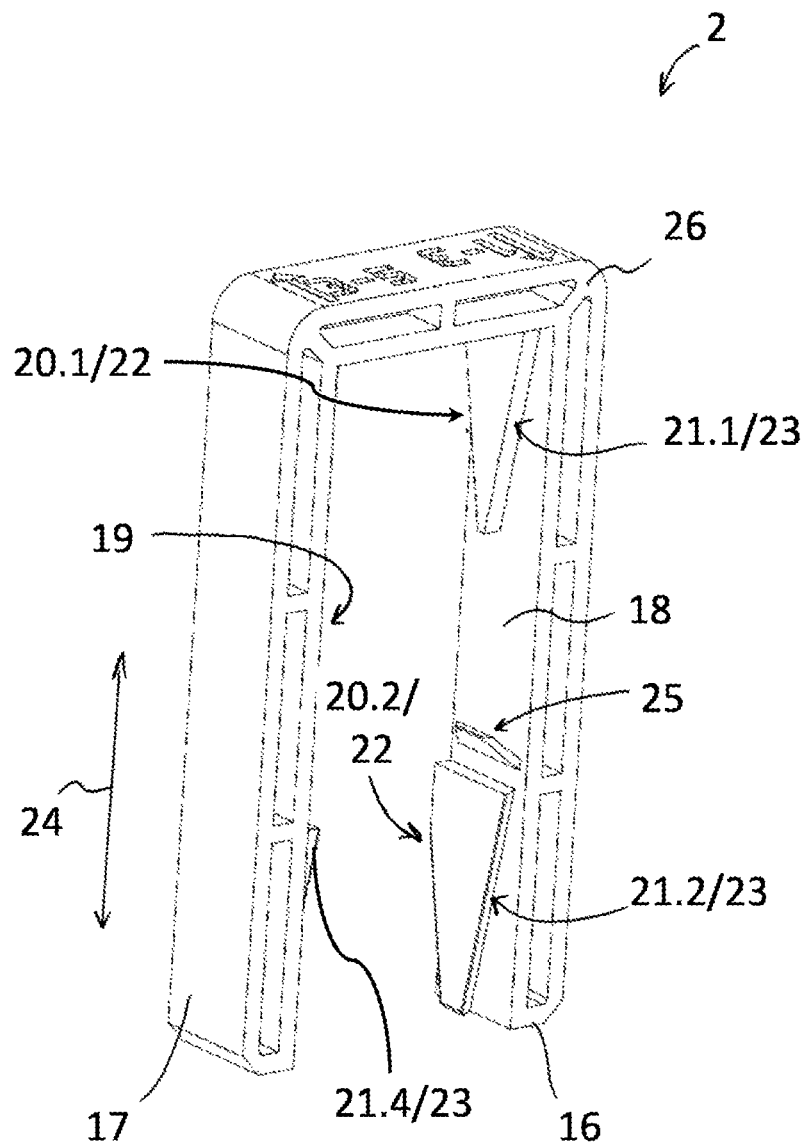
FIG. 6 is a perspective view of a connection body of the connection arrangement according to the invention.
Figure 9:
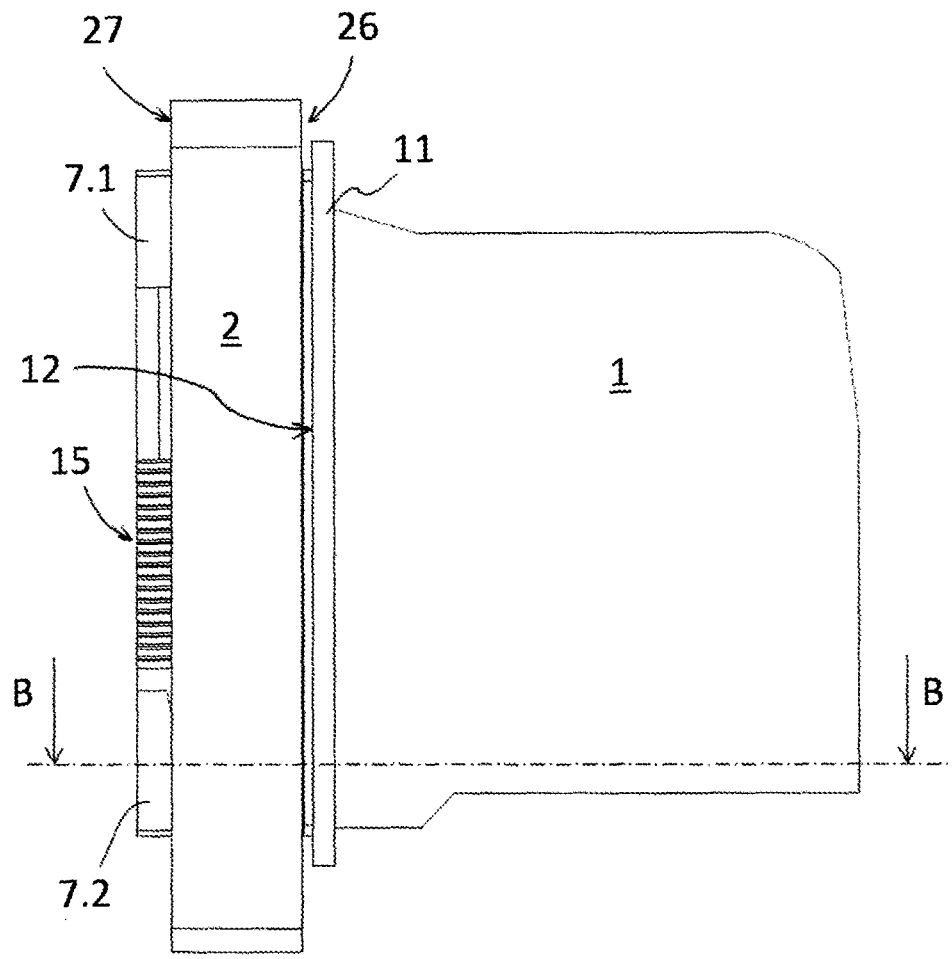
FIG. 9 is a side view of an assembly situation of the connection arrangement according to the invention.
Figure 12:
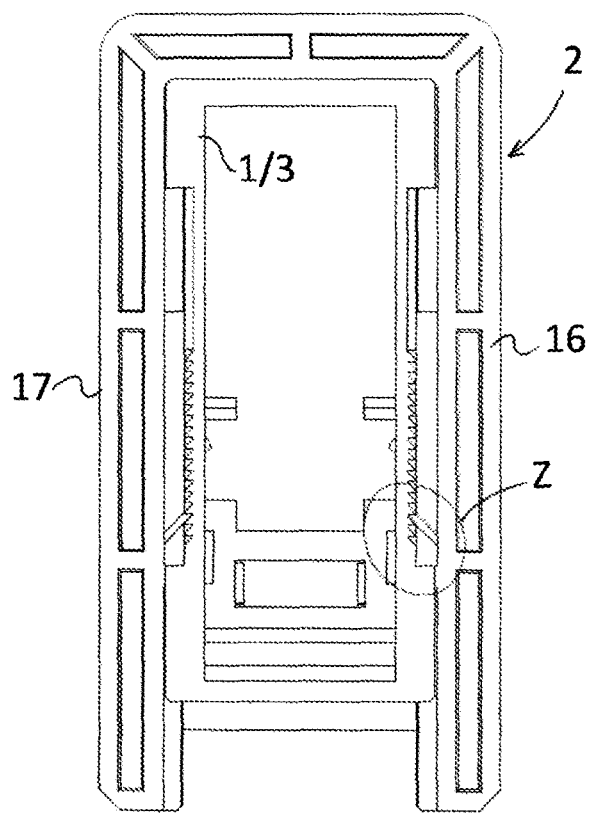
FIG. 12 is a front side view of the assembled connection arrangement according to FIG. 9.
Figure 13:
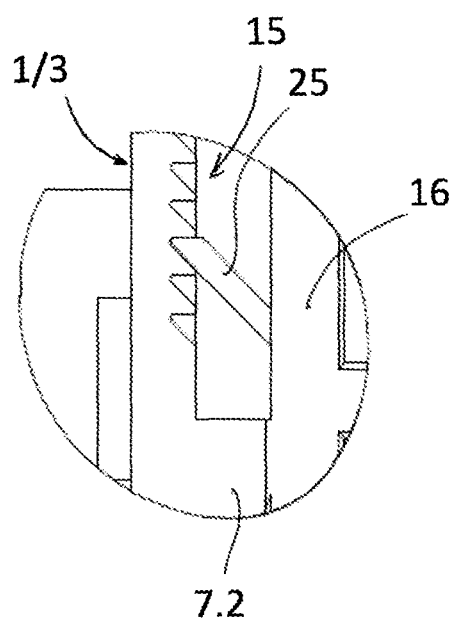
FIG. 13 is an enlargement of a detail of the portion Z according to FIG. 12.

A connection arrangement according to the invention comprises a housing body 1 according to FIGS. 1 to 5 and a connection body 2 according to FIGS. 6 to 8. The connection arrangement according to the invention is assembled for example on a device wall of a device. The connection arrangement is used for example to lock a terminal on the device wall.

The housing body 1 provides a connection portion 3 and a bearing portion 4 which is adjacent to the connection portion 3. The connection portion 3 has a substantially cross section having two opposing casing side faces 5, 6. In each case, two housing bearing wedges 7.1, 7.2, 7.3, 7.4 are provided at a distance from one another on the opposing casing side faces 5, 6. The casing sides 5, 6 define two opposing longitudinal sides of the connection portion 3. A bearing face 8 facing the bearing portion 4 of the housing body 1 is provided on each housing bearing wedge 7.1, 7.2, 7.3, 7.4. With respect to a longitudinal direction 9 of the longitudinal sides 5, 6, which is defined by the longitudinal sides 5, 6, the housing bearing wedges 7.1, 7.2, 7.3, 7.4 and the bearing faces 8 formed on the housing bearing wedges 7.1, 7.2, 7.4 are oriented at a wedge angle 10. In the present embodiment of the invention, the wedge angle 10 is approximately 10°.

The bearing portion 4 of the housing body 1 comprises a collar 11 enclosing the connection portion 3 on the casing side. In the region of the collar 11, a clamping face 12 facing the bearing faces 8 of the housing bearing wedges 7.1, 7.2, 7.4 is formed so as to be adjacent to the connection portion 3. The clamping face is flat and planar. Said face defines a plane of extension 13 of the bearing portion 4.

The inclination of the bearing faces 8 at the wedge angle 10 is superimposed on another inclination. With respect to the plane of extension 13, the bearing faces 8 of the housing bearing wedges 7.1, 7.2, 7.3, 7.4 are additionally arranged so as to be inclined at the setting angle 14. The setting angle 14 defines an undercut and in the present case is approximately 30°.

A snap-in receiver 15 is provided between two housing bearing wedges 7.1, 7.2, 7.3, 7.4 which are assigned to the same casing side face 5, 6 of the connection portion 3. The snap-in receiver 15 has a regular, prism-type surface structure. In particular, the prism-type surface structure of the snap-in receiver is constructed in the present case in the manner of a sawtooth.

The connection body 2 of the connection arrangement according to the invention in particular U-shaped. Two mutually opposing free branches 16, 17 of the connection body 2 have an elongate design and are in particular flexible. On mutually opposing inner faces 18, arrowhead-shaped recesses are provided in the free branches 16, 17 of the connection body 2, which recesses each define a first connection bearing wedge 20.1, 20.2, 20.3, 20.4 and a connection bearing wedge 21.1, 21.2, 21.3, 21.4. First bearing faces 22 and second bearing faces 23 are formed on the connection bearing wedges 20.1, 20.2, 20.3, 20.4, 21.1, 21.2, 21.3, 21.4 of the connection body 2. With respect to a longitudinal direction 24 of the connection body 2, which direction is defined by the elongate free branches 16, 17, the first bearing faces 22 and the second bearing faces 23 are set at the value of the wedge angle 10. However, the inclination of the first bearing faces 22 and of the second bearing faces 23 is produced as a mirror image or with opposite signs with respect to the longitudinal direction 24 so as to achieve the arrowhead shape of the recess.

On each inner face 18, 19 of the free branches 16, 17, in each case two recesses, which define the first connection bearing wedge 20.1, 20.3, 20.4 and the second connection bearing wedge 21.1, 21.2, 21.3, 21.4, are provided at a distance from one another. Between the two recesses which are provided on the same inner face 18, 19, a snap-in element 25 is provided in each case. The snap-in element 25 protrudes from the free branches 16, 17 towards the opposing inner faces 18, 19. Said element is geometrically designed in such a way that the snap-in element 25 engages in the snap-in receiver 15 when the connection arrangement is assembled, which receiver is provided on the housing body 1 in the region of the connection portion 3.

Opposing end faces 26, 27 of the connection body 2 define a first clamping face and a second clamping face of the connection body 2. The clamping faces 26, 27 have a planar design. The first clamping face 26 in this case is functionally assigned to the first bearing face 22 of the first connection bearing wedges 20.1, 20.2, 20.3, 20.4. The second clamping face 27 is functionally assigned to the second bearing face 23 of the second connection bearing wedges 21.1, 21.2, 21.3, 21.4. A minimum distance 35 between the first bearing face 22 and the first clamping face 26 in this case is greater than a minimum distance 36 between the first bearing face 23 and the second clamping face 27. The distance dimensions in this case are based on the same reference point which is formed between the connection bearing wedges 20.1, 20.2, 20.3, 20.4, 21.1, 21.2, 21.3, 21.4 and determined transversely to the longitudinal direction 24.

The connection body 2 is formed so as to be symmetrical with respect to a longitudinal center line 28 which extends in the longitudinal direction 24.

FIGS. 9 to 13 show the connection arrangement according to the invention in the assembled state. In this case, the connection body 2 is positioned on the housing body 1 in the region of the connection portion 3. In this case, the mutually facing inner faces 18, 19 of the free branches 16, 17 are at any rate adjacent in some portions to the casing side faces 5, 6. assembly takes place in that the U-shaped connection body 2 is positioned on the housing 1 in an assembly direction 29. In the course of the assembly, in this case, the bearing faces 8 the housing body are applied to the first bearing faces 22 of the connection body 2. In this during the assembly, as a result of the bearing of the bearing faces 8, 22 which is set at the clamping angle 10, the first clamping face 26 of the connection body 2 is moved closer to the clamping face 12 which is formed on the bearing portion 4 of the housing body 1. A housing wall can be locked between the mutually opposing clamping faces 12, 26 as a result of this.

As a result of the undercut (setting angle 14) which is formed in the bearing faces 8, 22, the free branches 16, 17 of the connection body 2 are applied to the casing side faces 5, 6 of the housing body 1. This results in a particularly advantageous locking or clamping of the device wall between the clamping faces 12, 26. When assembled, the connection body 2 is locked on the housing body 1 in an interlocking manner, moreover by the snap connection, which is formed by the snap-in receiver 15 and the resiliently provided snap-in element 25. In this case, the snap-in element 25 engages once again in a hook-like manner in the surface structure of the snap-in receiver 15 and prevents the connection body 2 from unintentionally shifting against the assembly direction 29.

Analogously, the connection body 2 can be rotated by 180° with respect to an assembly axis of rotation 34. In the present embodiment of the invention, the assembly axis of rotation 34 coincides with the longitudinal center line 28 of the connection body 2. By rotating the connection body 2 about the assembly axis of rotation 34, the second bearing faces 23 of the connection body 2 are applied to the bearing faces 8 of the housing body 1. A device wall is then clamped between the clamping face 12 of the housing body 1 and the second clamping face 27 of the connection body 2.

Different assembly situations of the connection arrangement according to the invention are shown in FIGS. 14 to 17. In particular, it is clear in this case that the same connection arrangement can be applied to devices having very different device wall thicknesses.

FIG. 14 shows the connection arrangement in a first assembly position. In this the first clamping face 26 of the connection body 2 is provided opposite the clamping face 12 the housing body 1. In this respect, a device wall is locked between the first clamping face 26 the connection body 2 and the clamping face 12 of the housing body 1. A distance 30 the clamping faces 12, 26 in the present case is approximately 1 mm.

FIG. 15 shows the connection arrangement in the same assembly position. The first clamping face 26 of the connection body 2 once again faces the clamping face 12 of the housing body 1. However, a distance of the clamping faces 12, 26 from one another is greater. In the present case, the distance is approximately 3 mm.

The assembly situations according to FIGS. 14 and 15 differ in particular by the relative assignment of the connection body 2 to the housing body 1. In this case, the different distance 30 is defined by a length 32, 33 of the bearing wedges 7.1, 7.2, 7.3, 7.4, 20.1, 20.2, 20.3, 20.4 and the size of the wedge angle 10.

A third assembly situation according to FIG. 16 provides the connection body 2 in a second assembly position which is rotated by 180° with respect to the first assembly position. In this case, the connection body 2 is rotated about the assembly axis of rotation 34 so that the second clamping face 27 of the connection body 2 is assigned to the clamping face 12 of the housing body 1. A distance 33 of the second clamping face 27 of the connection body 2 from the clamping face 12 of the housing body 1 is approximately 3 mm.

In the fourth assembly situation according to FIG. 17, the connection body is once again provided in the second assembly position. However, due to the different position of the connection body 2 relative to the housing body 1, the distance between the mutually facing clamping faces 12, 27 in the present case is approximately 5 mm.

In the second assembly position according to FIGS. 16 and 17, the second bearing face 23, which is formed on the second connection bearing wedges 21.1, 21.2, 21.3, 21.4 of the connection body 2 is applied to the bearing faces 8 of the housing bearing wedges 7.1, 7.2, 7.3, 7.4.

Like components and component functions are characterized by the same reference signs.

While the invention has been illustrated and described in detail in the drawings foregoing description, such illustration and description are to be considered illustrative or exemplary and not restrictive. It will be understood that changes and modifications may be made by those of ordinary skill within the scope of the following claims. In particular, the present invention covers further embodiments with any combination of features from embodiments described above and below. Additionally, statements made herein the invention refer to an embodiment of the invention and not necessarily all embodiments.

The terms used in the claims should be construed to have the broadest reasonable interpretation consistent with the foregoing description. For example, the use of the article or "the" in introducing an element should not be interpreted as being exclusive of a plurality elements. Likewise, the recitation of "or" should be interpreted as being inclusive, such that the recitation of "A or B" is not exclusive of "A and B," unless it is clear from the context or foregoing description that only one of A and B is intended. Further, the recitation of "at least one of A, B and C" should be interpreted as one or more of a group of elements consisting of B and C, and should not be interpreted as requiring at least one of each of the listed elements B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 housing body
2 connection body
3 connecting portion
4 bearing portion
5 casing side face
6 casing side face 7.1 housing bearing wedge
7.2 housing bearing wedge
7.3 housing bearing wedge
7.4 housing bearing wedge
8 bearing face
9 longitudinal direction
10 wedge angle
11 collar
12 clamping face
13 plane of extension
14 setting angle
15 snap-in receiver
16 free branch
17 free branch
18 inner face
19 inner face
20.1 first connection bearing wedge
20.2 first connection bearing wedge
20.3 first connection bearing wedge
20.4 first connection bearing wedge
21.1 second connection bearing wedge
21.2 second connection bearing wedge
21.3 second connection bearing wedge
21.4 second connection bearing wedge
22 first bearing face
23 second bearing face
24 longitudinal direction
25 snap-in element
26 first clamping face
27 second clamping face
28 longitudinal center line
29 assembly direction
30 distance
31 distance
32 length
33 length
34 assembly axis of rotation
35 minimum distance
36 minimum distance

The invention claimed is:

1. A connection arrangement comprising:
a housing body having a connection portion, at which in each case at least one housing bearing wedge having a bearing face which is oriented at a wedge angle to an assembly direction is formed on two opposing sides; a bearing portion; and a clamping face which is formed on the bearing portion being provided at a distance from the bearing face of the at least one housing bearing wedge; and
a connection body which can be positioned on the housing body in the region of the connection portion, on which connection body at least one connection bearing wedge is provided, which has a bearing face which is oriented at the same wedge angle to the assembly direction, the bearing faces of the housing bearing wedge and of the connection bearing wedge being in contact with one another when assembled,
wherein, on the connection body, at least a first connection bearing wedge and a second connection bearing wedge are provided, a first bearing face being provided on the first connection bearing wedge, and a second bearing face being provided on the second connection bearing wedge, the first bearing face and the second bearing face enclosing the same size wedge angle, and
wherein the wedge angle which is formed between the first bearing face and the assembly direction is provided as a mirror image with respect to the second wedge angle which is formed between the second bearing face and the assembly direction, such that, in a first assembly position, the first bearing face of the connection body is arranged on the bearing face of the housing bearing wedge, and such that, in a second assembly position which is occupied by rotating the connection body by 180° about an assembly axis of rotation, the second bearing face of the connection body is arranged on the bearing face of the housing bearing wedge.

2. The connection arrangement according to claim 1, wherein a first clamping face which is functionally assigned to the first bearing face and a second clamping face which is functionally assigned to the second bearing face are provided on the connection body, the first clamping face or the second clamping face of the connection body, when assembled, facing the clamping face which is provided on the bearing portion of the housing body, and a minimum distance of the first bearing face from the first clamping face of the connection body, which is determined transversely to the assembly direction, being greater than a minimum distance of the second bearing face from the second clamping face of the connection body, which is determined transversely to the assembly direction, and/or wherein the first clamping face and the second clamping face define mutually opposing end faces of the connection body.

3. The connection arrangement according to claim 2, wherein a distance of the clamping face which is formed on the bearing portion of the housing body from the first clamping face of the connection body in the first assembly position, which distance is determined transversely to the assembly direction, is between 0.5 mm and 3.5 mm, and
wherein a distance between the second clamping face of the connection body and the clamping face which is formed on the bearing portion of the housing body in the second assembly position, which distance is determined transversely to the assembly direction, is between 2.5 mm and 5.5 mm.

4. The connection arrangement according to claim 2, wherein the bearing faces which are formed on the connection body, and the bearing faces which are formed on the housing body, are oriented at a corresponding setting angle to a plane of extension of the assigned clamping faces of the connection body and of the housing body.

5. The connection arrangement according to claim 1, wherein connection bearing wedges which are assigned to one another in mutually opposing pairs are provided on the connection body, the connection bearing wedges being oriented symmetrically with respect to the assembly axis of rotation of the connection body.

6. The connection arrangement according to claim 1, wherein in each case, at least two housing bearing wedges and/or connection bearing wedges are formed on the housing body and/or on the connection body on two opposing sides, the bearing wedges which are provided on the same side each being provided at a distance from one another in a longitudinal direction of the housing body and/or of the connection body.

7. The connection arrangement according to claim 1, wherein, to lock the connection body on the connection portion of the housing body in the first assembly position and/or in the second assembly position, a snap connection is provided, a resilient snap-in element and a snap-in receiver being provided as part of the snap connection, which face one another in the first assembly position and/or in the second assembly position in such a way that the resiliently formed snap-in element engages in the snap-in receiver.

8. The connection arrangement according to claim 1, wherein the connection body is U-shaped, two free branches of the connection body having a flexible design, and in each case at least a first connection bearing wedge and a second connection bearing wedge are provided on opposing inner faces of the free branches.

9. The connection arrangement according to claim 1, wherein the assembly axis of rotation is oriented in the assembly direction and/or the assembly axis of rotation defines an axis of symmetry of the connection body.

\* \* \* \* \*